US012098931B1

(12) United States Patent
Passarini et al.

(10) Patent No.: US 12,098,931 B1
(45) Date of Patent: Sep. 24, 2024

(54) REFLECTOR-BASED SURVEYING FOR AUTOMATED GUIDED VEHICLES

(71) Applicant: Amazon Technologies, Inc., Seattle, WA (US)

(72) Inventors: Raul A. Passarini, Edgwood, WA (US); Loan Thi Tuong Le, Seattle, WA (US); Eric Horbatiuk, Seattle, WA (US); Kent Belden Meiswinkel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 17/480,749

(22) Filed: Sep. 21, 2021

(51) Int. Cl.
  *G01C 21/00* (2006.01)
  *G01C 15/04* (2006.01)
  *G01S 17/89* (2020.01)

(52) U.S. Cl.
  CPC .......... *G01C 21/383* (2020.08); *G01C 15/04* (2013.01); *G01C 21/3837* (2020.08); *G01C 21/3841* (2020.08); *G01S 17/89* (2013.01)

(58) Field of Classification Search
  CPC .............. G01C 21/383; G01C 21/3837; G01C 21/3841; G01S 17/89; G06T 7/73; G05D 1/02
  USPC ........................................................ 701/450
  See application file for complete search history.

(56) References Cited

U.S. PATENT DOCUMENTS

| | | | | |
|---|---|---|---|---|
| 5,812,267 A | * | 9/1998 | Everett, Jr. | G01S 5/16 |
| | | | | 356/614 |
| 9,784,675 B2 | * | 10/2017 | Cooke | G01C 15/02 |
| 2018/0306587 A1 | * | 10/2018 | Holz | G01S 5/16 |
| 2019/0108647 A1 | * | 4/2019 | Lee | G06F 18/28 |
| 2019/0229485 A1 | * | 7/2019 | Miwa | G02F 1/133553 |
| 2019/0391269 A1 | * | 12/2019 | Bartlett | B25J 9/1676 |
| 2020/0372664 A1 | * | 11/2020 | He | G01S 17/931 |
| 2021/0325520 A1 | * | 10/2021 | Cai | B32B 33/00 |

* cited by examiner

*Primary Examiner* — Todd Melton
*Assistant Examiner* — Vincent Feng
(74) *Attorney, Agent, or Firm* — Thomas | Horstemeyer, LLP

(57) ABSTRACT

Disclosed are various embodiments for a surveying and navigation system that includes reflectors designed to both (1) facilitate surveying of a facility area using a three-dimensional (3D) light detection and ranging (LiDAR) scanner and (2) enable guidance of an automated guided vehicle (AGV) within the facility area. The reflectors are designed to include at least one surface section that is free of a highly reflective surface (e.g., retro-reflective) that is used to guide the AGVs within a facility. When a reflector is scanned by the surveying during a surveying phase, the surface section of the reflector surface that is free of the reflective surface scatters the light associated with the scan. The corresponding scattered data can be used to discern the shape of the reflector thereby enabling an accurate determination of the reflector location coordinates for surveying.

20 Claims, 10 Drawing Sheets

| Reflector ID | Design Location | | As Built Location | | Delta (Design – as Built) | | | | | | Notes |
|---|---|---|---|---|---|---|---|---|---|---|---|
| | X(FT) | Y(FT) | X(FT) | Y(FT) | X(FT) | Y(FT) | Distance (FT) | X(IN) | Y(IN) | Distance (IN) | |
| 1 | 308.23 | 278.33 | 308.33 | 278.49 | -0.10 | -0.16 | 0.19 | -1.20 | -1.96 | 2.29 | |
| 2 | 309.84 | 238.80 | 309.96 | 238.90 | -0.12 | -0.10 | 0.15 | -1.39 | -1.19 | 1.83 | |
| 3 | 308.88 | 207.89 | 309.01 | 207.95 | -0.12 | -0.06 | 0.14 | -1.50 | -0.69 | 1.65 | |
| 4 | 308.86 | 188.99 | 308.96 | 189.02 | -0.10 | -0.04 | 0.11 | -1.21 | -0.44 | 1.28 | |
| 5 | 308.79 | 179.29 | 308.91 | 179.29 | -0.12 | 0.00 | 0.12 | -1.41 | 0.00 | 1.41 | Baseline |
| 7 | 348.01 | 207.16 | 348.18 | 207.24 | -0.17 | -0.08 | 0.18 | -2.01 | -0.93 | 2.21 | |
| 8 | 348.03 | 247.34 | 348.18 | 247.46 | -0.15 | -0.12 | 0.19 | -1.80 | -1.40 | 2.28 | |
| 10 | 347.97 | 269.27 | 348.13 | 269.43 | -0.16 | -0.17 | 0.23 | -1.94 | -2.00 | 2.79 | |
| 11 | 309.81 | 158.93 | 309.93 | 158.90 | -0.13 | 0.03 | 0.13 | -1.55 | 0.39 | 1.60 | |
| 13 | 249.26 | 239.90 | 249.27 | 239.99 | -0.01 | -0.09 | 0.09 | -0.07 | -1.09 | 1.09 | |
| 20 | 248.95 | 277.26 | 248.96 | 277.39 | -0.01 | -0.12 | 0.12 | -0.08 | -1.47 | 1.47 | |
| 21 | 284.42 | 188.99 | 284.47 | 189.01 | -0.05 | -0.02 | 0.05 | -0.58 | -0.27 | 0.64 | |
| 30 | 189.97 | 238.77 | 189.92 | 238.85 | 0.05 | -0.08 | 0.09 | 0.61 | -0.90 | 1.09 | |
| 34 | 189.99 | 198.92 | 189.95 | 198.95 | 0.04 | -0.02 | 0.05 | 0.46 | -0.29 | 0.54 | |
| 36 | 222.57 | 209.48 | 222.56 | 209.53 | 0.00 | -0.05 | 0.05 | 0.03 | -0.64 | 0.64 | |
| 44 | 189.91 | 158.93 | 189.94 | 158.95 | -0.02 | -0.02 | 0.03 | -0.30 | -0.26 | 0.39 | |
| 45 | 235.37 | 178.88 | 235.37 | 178.88 | 0.00 | 0.00 | 0.00 | 0.00 | 0.00 | 0.00 | Basepoint |
| 46 | 271.96 | 178.84 | 272.00 | 178.86 | -0.03 | -0.01 | 0.03 | -0.38 | -0.16 | 0.41 | |
| 47 | 247.59 | 189.01 | 247.60 | 189.02 | -0.01 | -0.01 | 0.02 | -0.12 | -0.15 | 0.19 | |
| 48 | 348.06 | 182.55 | 348.19 | 182.60 | -0.12 | -0.05 | 0.13 | -1.48 | -0.57 | 1.59 | |

REFLECTOR-BASED SURVEYING FOR AUTOMATED GUIDED VEHICLES

BACKGROUND

Automated guided vehicles (AGVs) can navigate through zones to move inventory that can be temporarily or otherwise stored. These zones can exist in inventory receive centers, fulfillment centers, inbound cross dock centers, sortation centers, as well as other distribution centers, warehouses, and other types of logistic spaces or facilities. An AGV can be an autonomous system that leverages a laser system (e.g., light detection and ranging (LiDAR) system) that uses reflectors to navigate through the zone based on a map of specific locations of the reflectors. A survey of the zone can be performed to identify the reflector locations used to generate the navigation map.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 7 is an example of a survey table used for generating an AGV map according to various embodiments of the present disclosure.

DETAILED DESCRIPTION

Figure 1:
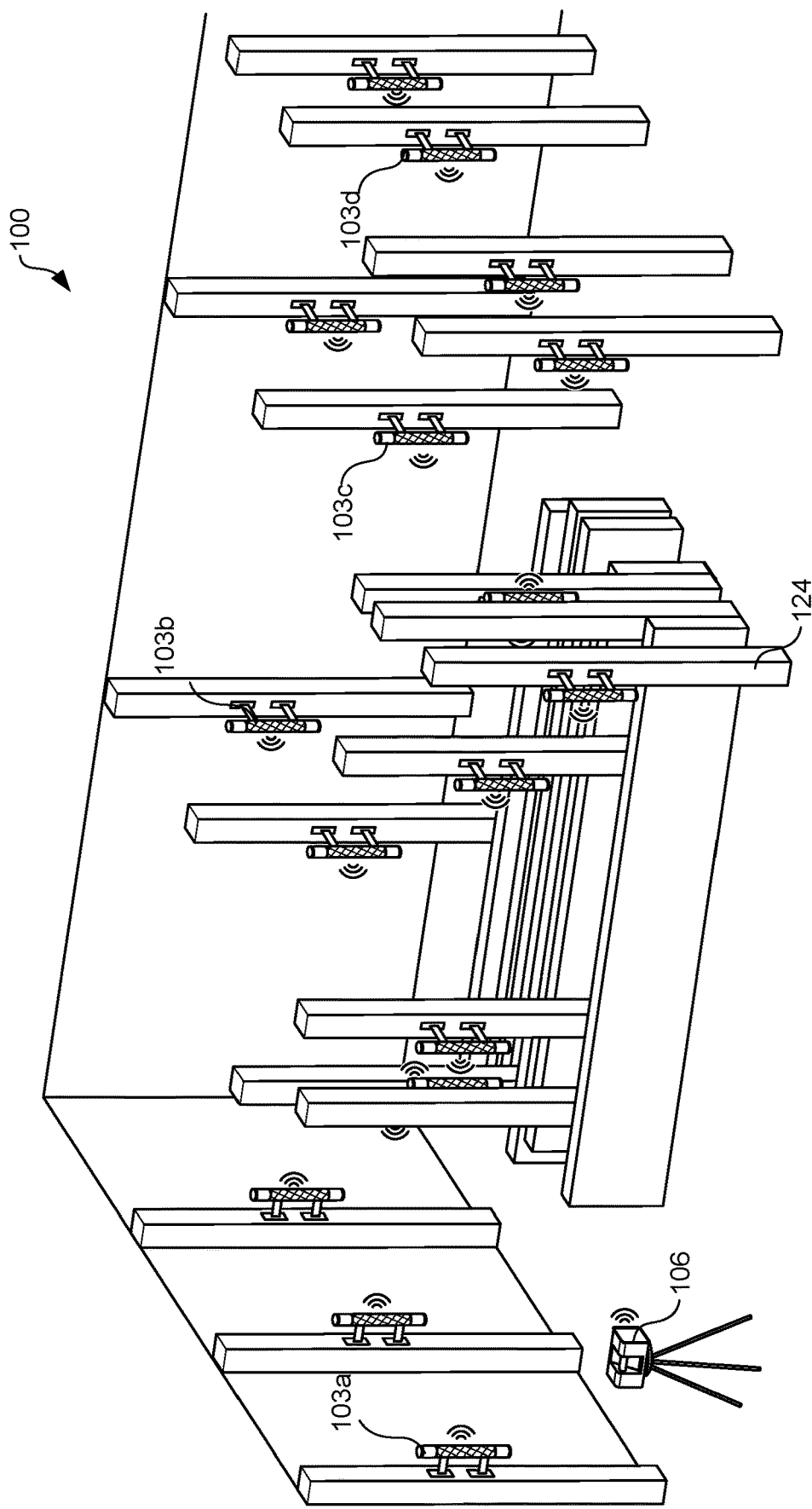
FIG. 1 is a drawing of an example scenario of surveying a facility space using a three-dimensional (3D) light detection and ranging (LiDAR) scanner to scan modified reflector devices distributed about the facility according to various embodiments of the present disclosure.

The present disclosure relates to a surveying and navigation system that includes reflectors designed to both (1) facilitate surveying of a facility area using a three-dimensional (3D) light detection and ranging (LiDAR) scanner and (2) enable guidance of an automated guided vehicle (AGV) within the facility area in accordance to various embodiments. In particular, the present disclosure relates to simplifying a process for surveying a facility area to identify reflector locations by using a 3D LiDAR scanner and by modifying reflectors to be compatible with both the 3D LiDAR scanner and the sensor(s) of an AGV. According to various examples, the reflectors of the present disclosure are designed to include a first end section and a second end section that are free of a highly reflective material (e.g., retro-reflective) that is used to guide the AGVs within a facility and is characteristically distinct from other surfaces in the facility. When a reflector is scanned by the 3D LiDAR scanner during a surveying phase, the portions of the reflector surface(s) of the disclosed reflectors that are free of the reflective surface scatters the light associated with the scan. The corresponding scattered data can be used to discern the shape of the reflector thereby enabling an accurate determination of the reflector location coordinates for surveying.

In various examples, an AGV can navigate through a facility by relying on a map of the facility environment and localizing itself based on the map. The map can be generated using a navigation mapping application that generates an environment map according to reflector location data corresponding to a distribution of reflectors within the facility. In various examples, the AGV may comprise a LIDAR navigation system that scans a distributed constellation of reflectors. The surface of the reflector can include a retro-reflective surface or material that makes the reflector characteristically distinct from other surfaces in the facility. The return signal for the AGV sensor can correspond to a reflection of the retro-reflective surface of the reflector. In various examples, reflectors can be distributed such that any position in the operational area has a unique fingerprint within the reflector array. The obtained scanned data corresponding to the retro-reflective material can be analyzed in view of the map of the facility environment in order to localize an AGV navigating throughout the facility. To obtain accurate reflector location data for generating the map, a survey of the facility environment is performed.

Prior to performing a survey of an environment, reflectors can be installed in a facility according to a reflector distribution plan. The reflector distribution plan can be determined based at least in part on path trajectories of AGVs within a facility, environment factors (e.g., obstacles, columns, shelving, doors, etc.) associated with the facility area, AGV reflector specifications (e.g., minimum number of reflectors required, minimum number for reflectors at each side of an AGV, spacing requirements of reflectors, etc.) and/or other factors. Once the reflector distribution plan is determined, the reflectors may be installed within the facility according to the reflector distribution plan. In various examples, the reflectors are installed manually. The scale of the installation and the accuracy limitations of the installers make the precise manual placement of reflectors implausible.

Traditional surveying can be executed by professional surveyors using theodolite devices or similar surveying equipment that measure an individual target (e.g., reflector) at a given instance. The collected data associated with multiple individual readings (e.g., a collection of individual target readings) can be processed to combine and generate an environmental layout. The traditional approach is estimated to require days and tens-of-thousands of dollars in contracted work. In order to reduce costs and time associated with the traditional surveying process, 3D stationary terrestrial LiDAR scanner technology is used in the present disclosure to generate a point cloud map of the spatial elements within the volume of the facility.

According to various embodiments, the 3D LiDAR scanner of the present disclosure relies on scattering off surfaces to generate a return signal and is able to measure multiple targets at the same time. The 3D LiDAR scanner can be used to scan a facility area and create a survey map for the facility area. However, relying on traditional reflector devices used for AGV navigation for surveying a facility environment using a 3D LiDAR scanner causes issues as the retro-reflective surface of the traditional reflector devices comprises negligible scattering properties that generate a poor signal, making it difficult to locate the reflector coordinates. To overcome this issue, the reflector device of the present disclosure is designed to enable navigation of the AGV throughout the facility and facilitate surveying of the facility using a 3D LiDAR scanner.

Turning now to FIG. 1, shown is an example scenario illustrating a survey taking place within a facility 100 having a plurality of reflector devices 103 (e.g., 103*a*, 103*b*, 103*c*, 103*d*) according to various embodiments. A facility 100 may comprise, for example, a large warehouse or other structure that includes zones and/or paths for navigation of AGVs moving inventory that can be temporarily or otherwise stored.

Figure 2:
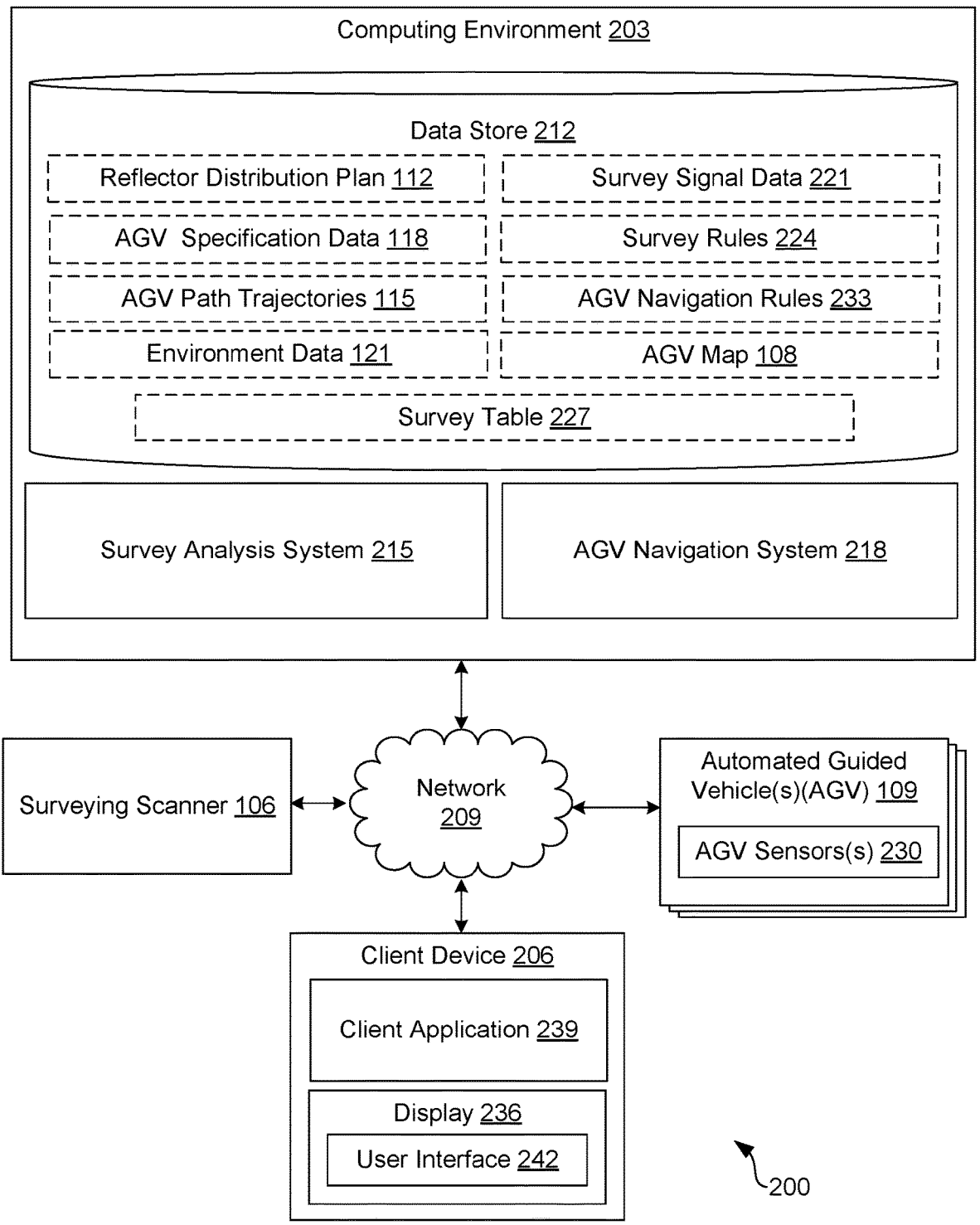
FIG. 2 is a schematic block diagram of a networked environment according to various embodiments of the present disclosure.

As shown in FIG. 1, a surveying scanner 106 is positioned at a given location within the facility 100 to obtain signal survey data associated with reflector devices 103 that are in line of sight of the surveying scanner 106. The surveying scanner 106 may comprises a 3D LiDAR scanner, and/or any other type of scanner that generates a point cloud map of the spatial elements within the volume of a space (e.g., facility area). According to various embodiments, the signal survey data can be processed to identify the reflectors 103 within the facility 100 and to determine cartesian coordinates corresponding to the reflectors 103. The cartesian coordinates specifying an actual location with a +/−five (5) millimeter tolerance requirement of the reflectors 103 can be used to create an AGV map 108 for navigation of an AGV 109 (FIG. 2). According to various examples, the surveying scanner 106 can be moved to different locations within the facility 100 during the surveying process to obtain survey data corresponding to the multiple locations to ensure the entirety of the facility environment is surveyed. It should be noted according to various examples, the surveying scanner 106 may leverage 3D stationary terrestrial LiDAR scanner technology that relies on scattering to obtain measurements associated with multiple targets (e.g., reflectors 103) at one scanning instance.

According to various examples, the reflector devices 103 are distributed about the facility 100 according to a reflector distribution plan 112 (FIG. 2) that provides a layout of the optimal placement of the reflector devices 103 for use with navigation of an AGV 109 (FIG. 2) within the facility 100. For example, the reflector distribution plan 112 can be determined based at least in part on AGV path trajectories 115 (FIG. 2) corresponding to determined paths of the AGV within the facility 100, AGV specification data 118 corresponding to reflector placement requirements (e.g., minimum number of reflectors required, spacing between reflectors, etc.) that are specific to the type of AGV 109, facility environment data 121 (FIG. 2) that defines the facility environment (e.g., obstacles, doors, shelving, mounting structures, columns, area dimensions), and/or other types of factors.

According to various embodiments, the reflector devices 103 are mounted to mounting structures 124 within the facility 100. Although the mounting structures 124 are illustrated as columns in FIG. 2, the mounting structure 124 may comprises any type of static structure (e.g., wall, column, post, etc.) within the facility 100. In various examples, the reflector devices 104 are placed in the center of the mounting structure surface or in alignment with the center of the surface of the mounting structure 124.

As will be discussed in greater detail with respect to FIG. 3, a reflector device 103 comprises a reflector body 127 (FIG. 3) and a reflective surface 130 that substantially surrounds a portion of the reflector body 127 leaving other portions of the reflector body surface free from the reflective surface 130. As previously discussed, the reflective surface 130 may comprise a retro-reflector having negligible scattering properties that generate a poor signal for the surveying scanner 106, making it difficult to locate the reflector coordinates based on the returned signal survey data. In various examples, the reflective surface 130 may comprises a tape, a sheet, a paint, an etching, and/or other type of material or surface as can be appreciated.

In contrast to the reflective surface 130, the exposed portions of the reflector body surface that are free from the reflective surface 130 have scattering properties that provide a return signal to the scan of the surveying scanner 106 in which the reflector location coordinates can be accurately determined. In various examples, the reflector body 127 may comprise a metal (e.g., aluminum, stainless steel, etc.), a plastic (e.g., acrylic, polyvinyl chloride (PVC), etc.), or other type of material having scattering properties that provide signal survey data that can be used to accurately identify the reflectors and the coordinates associated with the reflectors 103, in accordance to various embodiments of the present disclosure. According to various embodiments, the scattering properties may be dependent upon specifications of the surveying scanner 106.

With reference to FIG. 2, shown is a networked environment 200 according to various embodiments. The networked environment 200 includes a computing environment 203, a surveying scanner 106, one or more AGVs 109, and a client device 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a survey analysis system 215, an AGV navigation system 218, and other applications, services, processes, systems, engines, or functionality not discussed in detail herein. The survey analysis system 215 is executed to analyze the survey signal data 221 obtained from the survey scanner 106 following a survey of a facility area 100 to determine cartesian coordinates associated with the reflectors 103 distributed within the facility 100. The survey analysis system 215 may analyze the survey signal data 221 to discern point clouds corresponding to the various reflectors 103. In some examples, the survey analysis system 215 may incorporate or integrate with known cloud-based registration software, such as, for example, Leica Cyclone®, to tie the signals from different surfaces to one another.

According to various examples, the survey analysis system 215 may create a single point cloud for each reflector 103 and isolate point cloud data for each of the reflectors 103. In various examples, the creation of the point cloud and isolation of the reflectors 103 may be based on a cylindrical modeling tool inside a computer-aided design (CAD) environment. Based on the isolated point clouds, the survey analysis system 215 may extract the centroid associated with the respective point cloud and determine x- and y-coordinates of the centroid for the respective reflectors 103. In various examples, one of the plurality of reflectors 103 distributed in the facility environment corresponds to a base point reflector 103 and the coordinates of the remaining reflectors 103 are determined relative to the location of the base reflector 103. In some examples, the base point reflector 103 is user defined. In other examples, the base point reflector 103 is selected by the survey analysis system 215.

In one or more embodiments, the survey analysis system 215 may generate a survey table 227 that includes a reflector identifier, an x-coordinate, a y-coordinate, and/or other information for each reflector 103. The data included in the survey table 227 can be used by the AGV navigation system 218 to generate the AGV map that the AGV 109 uses for localization to navigate through the facility 100. In some examples, the survey table 227 further identifies the base point reflector 103.

In some examples, the survey analysis system 215 may determine the reflector distribution plan 112 for reflector placement within the facility area. For example, the reflector distribution plan 112 may be determined based at least in part on one or more AGV path trajectories 115 (FIG. 2) corresponding to determined paths of the AGV within the facility 100, AGV specification data 118 corresponding to reflector placement requirements (e.g., minimum number of reflectors required, spacing between reflectors, etc.) that are specific to the type of AGV 109, facility environment data 121 (FIG. 2) that defines the facility environment (e.g., obstacles, doors, shelving, mounting structures, columns, area dimensions), and/or other types of factors.

In various examples, a user interacting with a client device 206 that is in data communication with the survey analysis system 215 may input the AGV path trajectories, the AGV specification data 118, and/or the facility environment data 121 via interactions with a user interface associated with the survey analysis system 215. In some examples, a user may identify the type of AGV 109 that will be navigating through the facility 100, and the survey analysis system 215 may communicate with one or more systems associated with the AGV 109 to obtain the AGV specification data 118.

The AGV navigation system 218 generates the AGV map 108 for AGV localization and navigation throughout the facility 100. In various examples, the AGV navigation system 218 analyzes the data included in the survey table 227 to create a map of the facility 100 with respect to the reflectors 103 distributed throughout the facility 100. The AGV map 108 may be generated based at least in part on the coordinate locations associated with each of the reflectors 103 relative to the location of the base reflector 103. When navigating through the facility 100, the AGV 109 may scan the surrounding area via the AGV sensors 230 and compare the data obtained from the AGV sensor(s) 230 (e.g., return signals corresponding to the reflective surface 130) with the AGV map 108 to localize for navigation through the facility 100. In various examples, the data included in the survey table 227 as well as the defined AGV paths may be provided as an input to the AGV navigation system 218 to generate the AGV map 108. In some examples, the AGV navigation system 218 may comprise a third-party navigation software such as, example, an AGV navigation software developed by Kollmorgen® and/or other navigation software developers.

The data stored in the data store 212 includes, for example, the reflector distribution plan 112, AGV specification data 118, one or more AGV path trajectories 115, AGV environment data 121, survey signal data 221, survey rules 224, AGV navigation rules 233, an AGV map 108, a survey table 227, and potentially other data. The reflector distribution plan 112 corresponds to a layout of the optimal placement of the reflector devices 103 are distributed about the facility 100. One or more users may rely on the reflector distribution plan 112 for installation of the reflectors 103 throughout the facility. In various examples, the reflector distribution plan 112 is determined based at least in part on AGV path trajectories 115, AGV specification data 118, environment data 121, and/or other factors.

The AGV path trajectories 115 correspond to defined paths of the AGV within the facility 100. In various examples, the AGV path trajectories 115 may be user defined. In other examples, the AGV path trajectories 115 are defined according to a facility layout and requirements of the AGV throughout the facility 100. The AGV specification data 118 corresponds to reflector placement requirements that are specific to the type of AGV 109. For example, the AGV specification data 118 may define a number of reflectors required for a start of the AGV 109, a number of reflectors required for an operation of the AGV 109, a minimum and/or a maximum spacing between reflectors 103, a number of reflectors 103 required on each side of the AGV 109, and/or other factors. The facility environment data 121 includes characteristics about the facility environment. For example, the facility environment data 121 may define obstacles, doors, shelving, mounting structures, columns, area dimensions, and/or other characteristics corresponding to the facility. In various examples, the facility environment data 121 may be user-defined via interactions with a user interface associated with the survey analysis system 215 and/or other type of application configured to generate the reflector distribution plan 112.

The survey signal data 221 corresponds to the data obtained from the surveying scanner 106 in response to one or more scans of the facility area. As previously discussed, the surveying scanner 106 may comprise a scanner that employs 3D stationary terrestrial LiDAR scanner technology for generating a point cloud map of the spatial elements within the volume of the facility 100. In particular, the surveying scanner 106 relies on scattering off surfaces to generate a return signal and is able to measure multiple targets at the same time. In various examples, the return signal for each scan corresponds to millions of points per second obtained from multiple targets in the line of sight of the surveying scanner 106. Accordingly, the survey signal data 221 comprises data associated with return signals and includes scattered data corresponding to the reflector surfaces having scattering properties corresponding to the specifications of the surveying scanner 106 such that the survey signal data 221 can be used to accurately identify the reflectors 103 and the coordinates associated with the reflectors 103.

The survey rules 224 include rules, models, and/or configuration data for the various algorithms or approaches employed by the survey analysis system 215. For example, the survey rules 224 may include the various models and/or probabilistic data structure algorithms used by the survey analysis system in determining the respective cartesian coordinates for each reflector 103 based at least in part on the survey signal data 221. Further, the survey rules 224 may include rules associated with the format and data to include in the survey table 227. In addition, the survey rules 224 may comprise models and/or rules for various algorithms configured to generate the reflector distribution plan 112.

The AGV navigation rules 233 include rules, models, and/or configuration data for the various algorithms or approaches employed by the AGV navigation system 218. For example, AGV navigation rules 233 may include the various models and/or probabilistic data structure algorithms used by the AGV navigation system 218 in generating an AGV map 108 for an AGV based at least in part on the data included in the survey table 227 generated by the survey analysis system 215.

The AGV map 108 corresponds to a map used by an AGV 109 to localize and navigation through the facility 100. When navigating through the facility 100, the AGV 109 may scan the surrounding area via the AGV sensors 230 and compare the data obtained from the AGV sensor(s) 230 (e.g., return signals corresponding to the reflective surface 130) with the AGV map 108 to localize for navigation through the facility 100.

The survey table 227 includes location data corresponding to each of the reflectors 103 distributed within the facility 100. In various examples, the survey table 227 includes a reflector identifier, an x-coordinate, a y-coordinate, and/or other information for each reflector 103. The data included in the survey table 227 can be used by the AGV navigation system 218 to generate the AGV map 108 that the AGV 109 uses for localization to navigate through the facility 100. In some examples, the survey table 227 further identifies the base point reflector 103. In various examples, the survey table 227 may be in a format that is compatible with a format defined by the AGV navigation system 218 to allow the AGV navigation system 218 to accurately analyze the survey table 227 and extract data for generating the AGV map 108.

The AGV(s) 109 comprises an automated wheel-based computer system that is configured to navigate within a space according to one or more AGV defined path trajectories 115. In various examples, the AGV 109 of the present disclosure operates based at least in part on the reflective features of the reflective surface 130 of the reflectors 103. For example, when navigating through the facility 100, the AGV 109 may scan the surrounding area via the AGV sensors 230 and compare the data obtained from the AGV sensor(s) 230 (e.g., return signals corresponding to the reflective surface 130) with the AGV map 108 to localize for navigation through the facility 100. In various examples, the AGV 109 scans the facility space by transmitting lasers via the AGV sensor 230. The transmitted lasers may be directly reflected from the reflective surface 130 of a reflector 103 thereby returning a return signal corresponding to the reflective surface 130. The AGV 109 may compare the return signal data corresponding to the reflector 103 with the AGV map 108 for localization of the AGV 109 and in turn for navigation of the AGV 109. According to various example, the AGV sensor 230 of the AGV may be configured to measure an individual target (e.g., a signal reflector 103) instead of multiple targets. In various examples, the AGV 109 is configured to carry a load for transporting about the facility space.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client 206 may include a display 236. The display 236 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a client application 239 and/or other applications. The client application 239 may be executed in a client 206, for example, to access network content served up by the computing environment 203 and/or other servers, thereby rendering a user interface 242 on the display 236. To this end, the client application 239 may comprise, for example, a browser, a dedicated application, etc., and the user interface 242 may comprise a network page, an application screen, etc. The client 206 may be configured to execute applications beyond the client application 239 such as, for example, email applications, social networking applications, word processors, spreadsheets, and/or other applications.

Next, a general description of the reflectors 103 of the present disclosure are discussed with regard to FIGS. 3-6 is provided followed by a general description of the operation of the various components of the networked environment 200 with regard to FIGS. 7-10. To begin, FIG. 3 corresponds to a perspective example view of a reflector 103 of the present disclosure. The reflector 103 comprises a reflector body 127 having a longitudinal length 303 extending from a first end to a second end. In various embodiments, the reflector body 127 has a first end section 306, a second end section 309, and a center section 312. In various examples, the reflector body is a cylindrical body. In one non-limiting example, the longitudinal length 303 is around eighty (80) centimeters. It should be noted that in various embodiments, the longitudinal length 303 can be shorter or longer than 80 cm, as can be appreciated. In various non-limiting examples, the reflector body 127 may comprise a diameter of about fifty millimeters (mm). It should be noted that in various embodiments, the diameter of the reflector body can be shorter or longer than 50 mm, as can be appreciated.

According to various examples, the reflector body 127 may comprise a metal (e.g., aluminum, stainless steel, etc.), a plastic (e.g., acrylic, polyvinyl chloride (PVC), etc.), or other type of material having scattering properties that provide survey signal data 221 that can be used to accurately identify the reflectors 103 and the coordinates associated with the reflectors 103, in accordance to various embodiments of the present disclosure. In particular, the material of the reflector body 127 comprises scattering properties within a range that results in scattering of a transmitted laser received from the surveying scanner 106 such that the geometry (e.g., cylindrical) of the reflector 103 can be discerned from the returned survey signal data 221. In various examples, the scattering coefficient of the surface of the reflector body 127 may be dependent upon the specifications of the surveying scanner 106.

The reflector 103 further comprises a reflective surface 130 substantially surrounding the center section 312 of the reflector body 127 thereby leaving the first end section 305 and the second end section 309 exposed and free of the reflective surface 130. In various examples, the reflective surface 130 may comprise a retro-reflector having negligible scattering properties that generate a poor signal for the surveying scanner 106, making it difficult to locate the reflector coordinates based on the returned signal survey data. The reflective surface 130 has reflective properties that are characteristically distinct from other surfaces in the facility 100. In various examples, the reflective surface 130 may comprises a tape, a sheet, a paint, an etching, and/or other type of material or surface as can be appreciated.

According to various embodiments, at least one portion of the reflector body 127 is free of the reflective surface 130. For example, as shown in FIG. 3, the first end section 306 and the second end section 309 of the reflector body 127 are free of the reflective surface 130. However, it should be noted that the embodiments of the reflector 103 are not limited to both the first end section 306 and the second end section 309 being free of the reflective surface 130. For example, in some embodiments, only one end section 306, 309 may be free of the reflective surface 130. In other embodiments, the non-reflective surfaces may be intertwined in the reflective surface in a design (e.g., stripes, dots, swirls, etc.) such that there are one or more portions of the reflector body 127 with the reflective surface 130 and one or more other portions of the reflector body 127 without the reflective surface 130.

Figure 3:
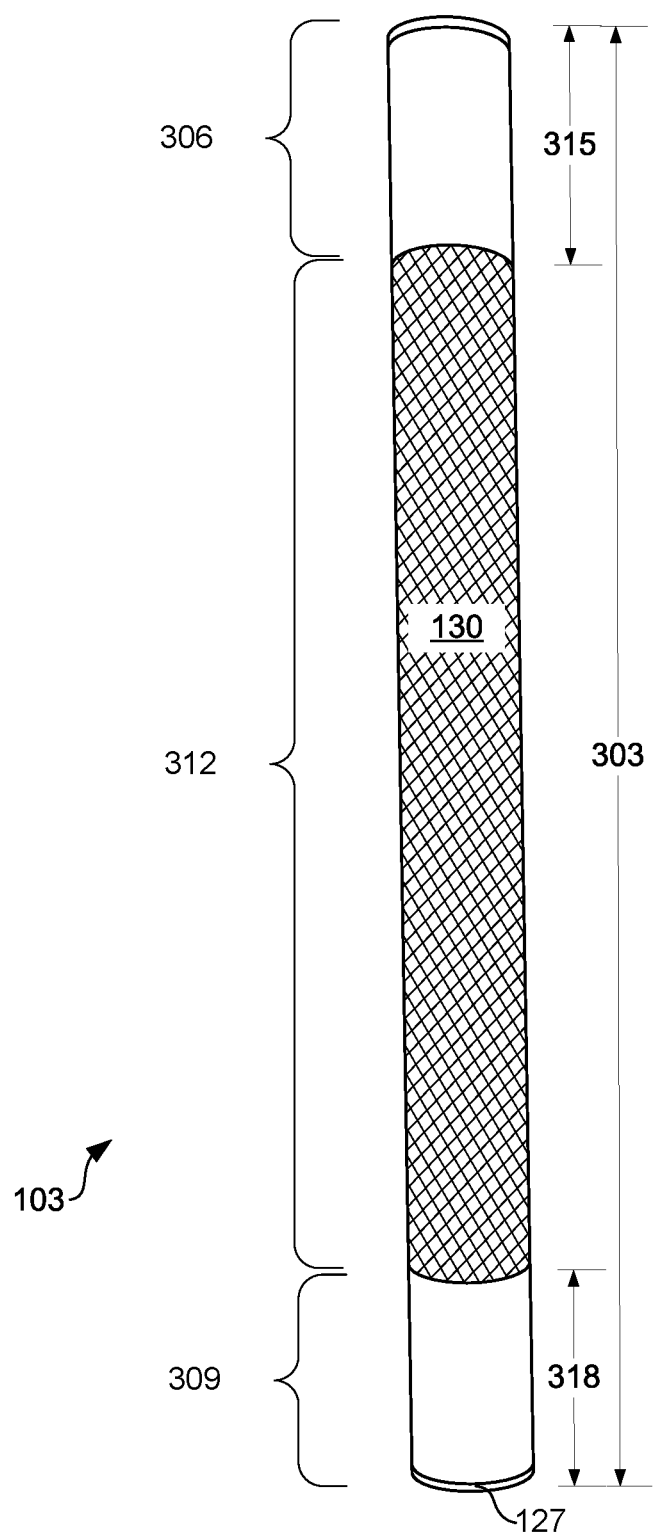
FIG. 3 is a perspective view of an example reflector device according to various embodiments of the present disclosure.

In the example of FIG. 3, the first end section 306 comprises a first exposed length 315 and the second end section 309 of the reflector body 127 that is free of the reflective surface 130 comprises a second exposed length 318. In some examples, the first exposed length 315 and the second exposed length 318 may extend to about fifty-five (55) cm. However, it should be noted that the first exposed length 315 and the second exposed length 318 are not limited to 55 cm and can be longer or shorter as can be appreciated.

According to various embodiments of the present disclosure, the first end section 306 and the second end section 309 are free of the reflective surface 130 to cause scattering within the return signal when surveying the facility 100 using the surveying scanner 106. The scattering in the return signal (e.g., survey signal data 221) allows for the cylindrical geometry of the corresponding reflector 103 to be determined upon an analysis and mapping of the survey signal data 221. As such, the first exposed length 315 and the second exposed length 318 are based on the amount of scattered data required to determine the geometry of the reflector 103 which may be dependent upon the properties of the surveying scanner 106.

Figure 4:
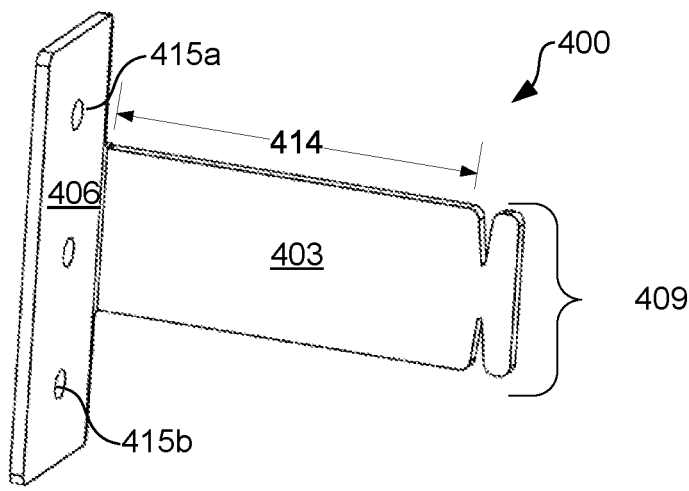
FIG. 4 is a perspective view of an example mounting bracket for mounting the reflector device of FIG. 3 to a mounting structure according to various embodiments of the present disclosure.

Turning now to FIG. 4, shown is a perspective view of an example of a mounting bracket 400 for mounting a reflector 103 to a mounting structure 124 in accordance to various embodiments. In various examples, the mounting bracket 400 comprises an L-shaped bracket comprising a first bracket member 403 extending perpendicularly away from a side end of a second bracket member 406 to form an L-shape or otherwise right angle. The first bracket member 403 is rectangular in shape and extends laterally away from a front face of the second bracket member 406. The first bracket member 403 is configured to engage with and support a reflector 103. In various examples, the first bracket member 403 comprises an engagement member 409 that is sized and shaped to interconnect with a slot 412 (FIG. 5) disposed within the longitudinal length of the reflector body 127. A length 414 of the first bracket member 403 extending from the second bracket member 406 to the engagement member 409 can vary based at least in part on a desired positioning of the reflector 103 from the mounting structure 124.

The second bracket member 406 is rectangular in shape and comprises a plurality of mounting apertures 415 (e.g., 415a, 415b) extending from a front face to a back face of the second bracket member 406. The plurality of mounting apertures 415 are designed to receive mounting connectors (e.g., screws) (not shown) that are configured to secure the second bracket member 406 to the mounting structure 124 such that the back face of the second bracket member 406 is adjacent to the surface of the mounting structure 124 as can be appreciated.

Figure 5:
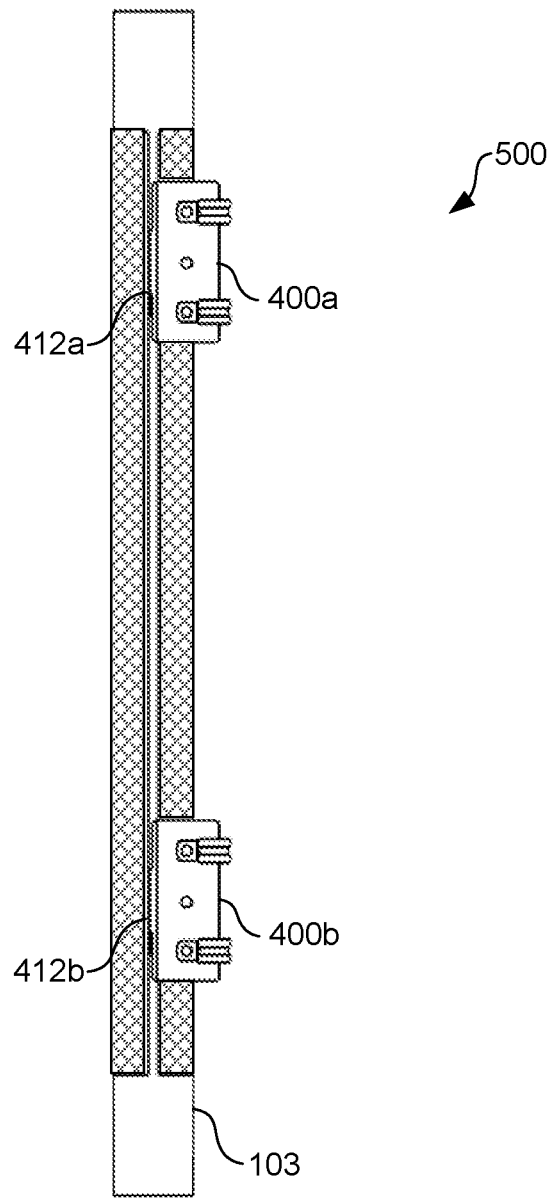
FIG. 5 is an example view of the mounting bracket of FIG. 4 engaged with the reflector device of FIG. 3 according to various embodiments of the present disclosure.
Figure 6:
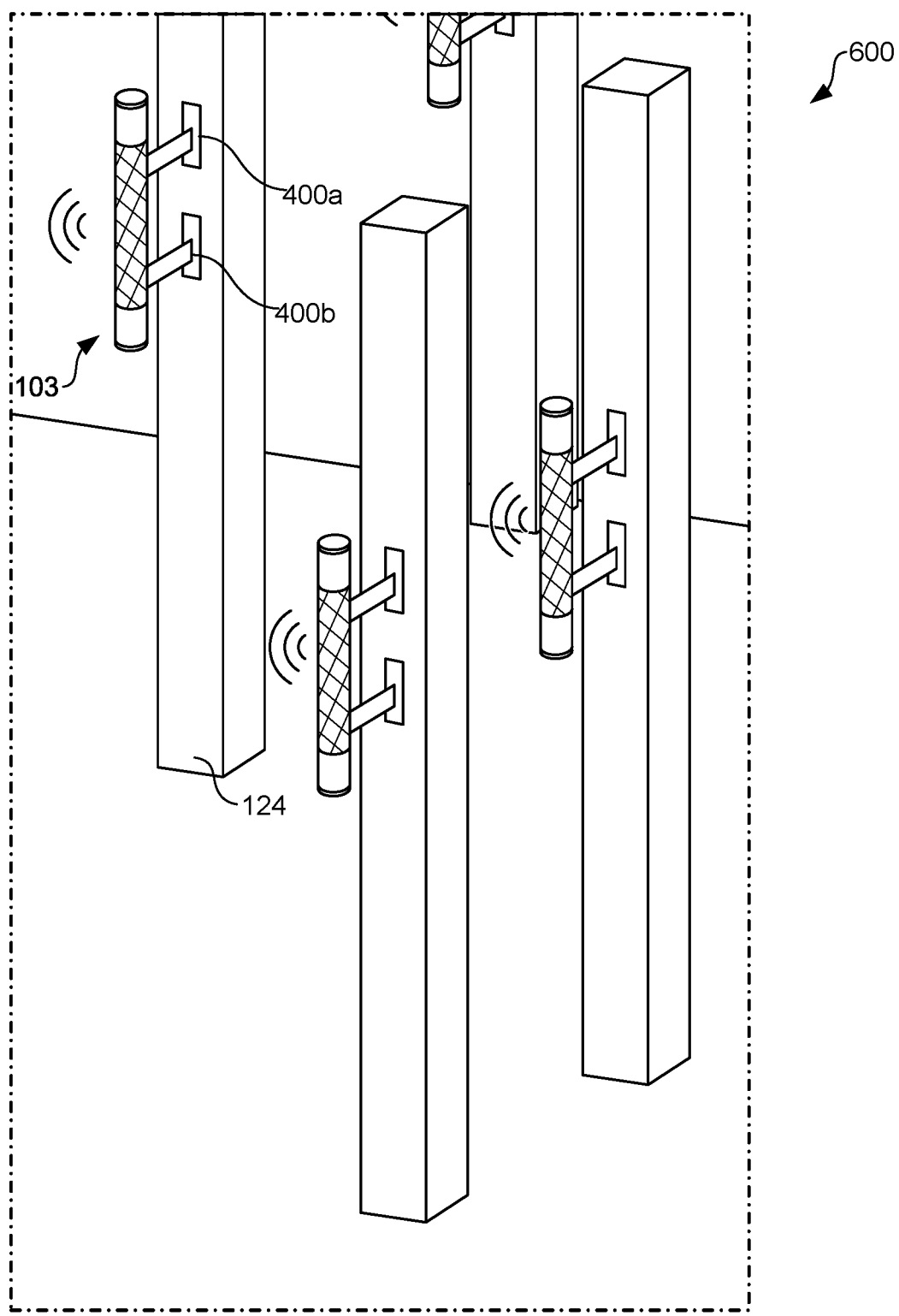
FIG. 6 is an example view of reflector devices of FIG. 3 mounted to mounting structures using the mounting bracket of FIG. 4 according to various embodiments of the present disclosure.

FIG. 5 illustrates an example view 500 of a back side of the reflector 103 where two mounting brackets 400 (e.g., 400a, 400b) are interconnected with the slots 412 (e.g., 412a, 412b) of the reflector 103 to support the reflector 103 when the reflector 103 is mounted, via the mounting brackets 400 to the mounting structures 124. FIG. 6 illustrates an example view 600 of reflectors 103 being mounted to the mounting structures 124 via the mounting brackets 400.

Turning now to FIG. 7, shown is an example survey table 227 that can be generated by the survey analysis system 215 in response to analyzing the survey signal data 221 obtained from the surveying scanner 106 performing a survey of the facility 100. According to various examples, the survey table 227 may include a reflector identifier, coordinate information associated with the reflector, and/or other information for each reflector 103. For example, the survey table 227 in FIG. 7 includes x- and y-coordinates associated with both the design location defined in the reflector distribution plan 112 as well as the determined x- and y-coordinates identified by the survey analysis system 215 upon an analysis of the survey signal data 221. The survey table 227 further identifies that the reflector 103 having an identifier of "45" is considered to be the base point reflector 103. In various examples, the data included in the survey table 227 can be used by the AGV navigation system 218 to generate the AGV map that the AGV 109 uses for localization to navigate through the facility 100.

Figure 8:
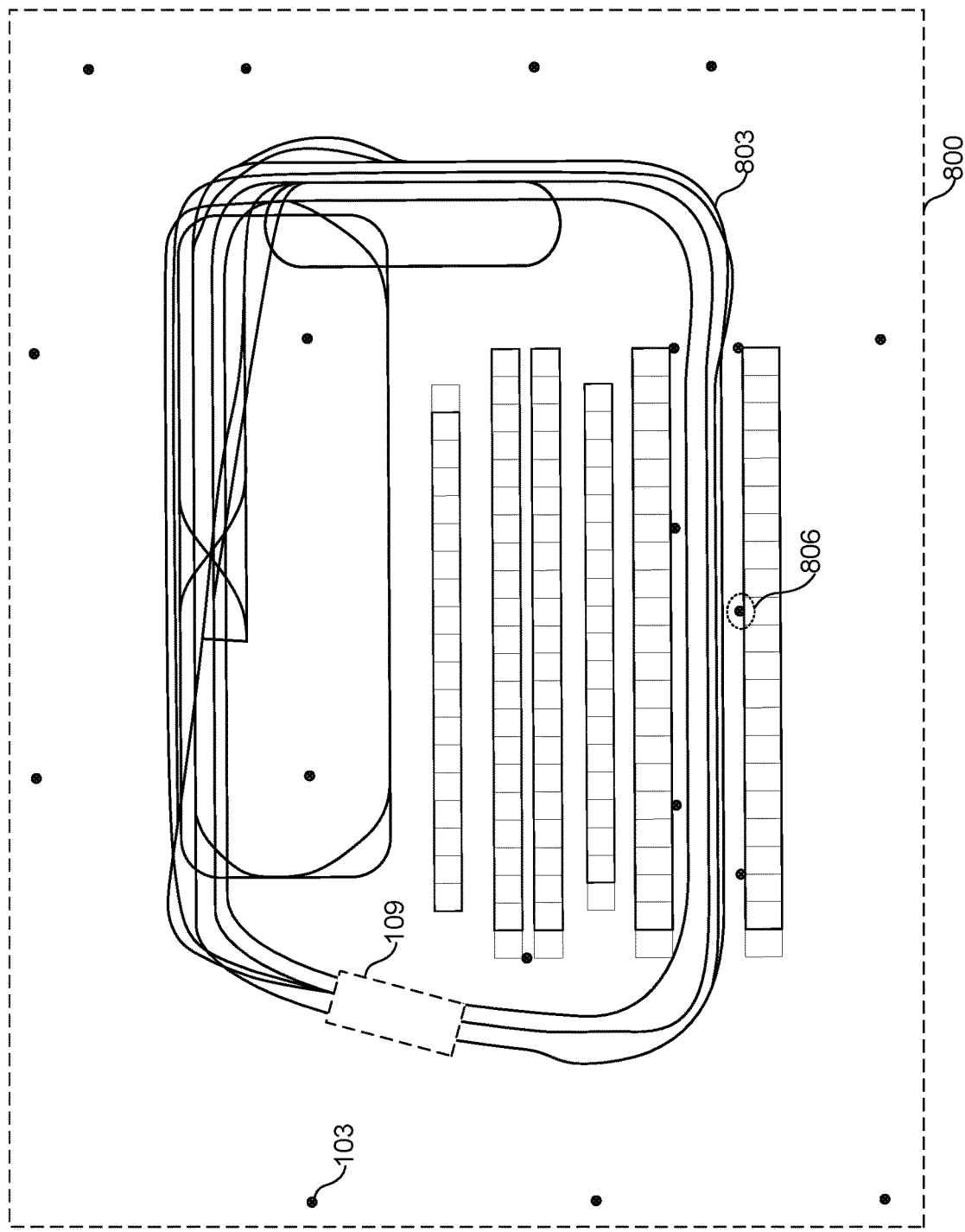
FIG. 8 is an example of AGV paths within a facility having the reflector devices of FIG. 3 according to various embodiments of the present disclosure.

Moving on to FIG. 8, shown is an example of a facility space layout 800 including reflectors 103 and defined paths 803 for an AGV 109 within the facility 100 according to various embodiments of the present disclosure. In particular, as shown in FIG. 8, the facility space layout 800 includes a plurality of defined paths 803 corresponding to the navigation of the AGV through the facility 100. Further shown are reflectors 103 distributed through the facility space including a reflector 103 that is determined to be the base reflector 806. When navigating through the facility 100, the AGV 109 may scan the surrounding area and compare the data received from the AGV sensor(s) 230 (e.g., return signals corresponding to the reflective surface 130 of the reflectors 103) with the AGV map 108 to localize for navigation through the facility 100 according to the one or more defined paths 803.

Figure 9:
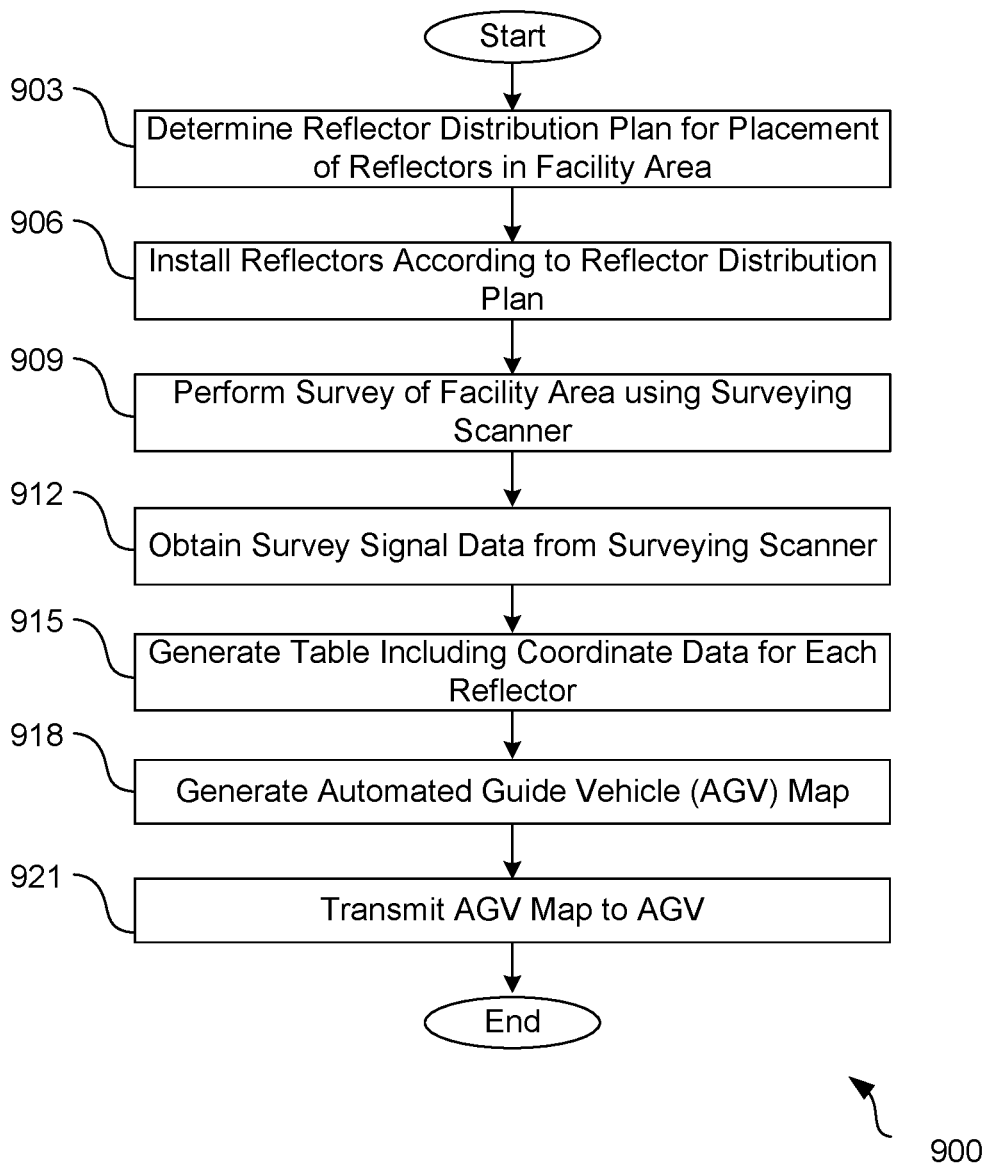
FIG. 9 is an example flowchart corresponding to the placement of reflectors within a facility and surveying of the facility to generate a navigation map for an AGV. The flowchart of FIG. 9 includes portions of functionality of a survey analysis system and an AGV navigation system executed in a computing environment in the networked environment of FIG. 2 according to various embodiments of the present disclosure.

Referring next to FIG. 9, shown is a flowchart that provides one example associated with the process of installing reflectors 103 within a facility and surveying of the facility 100 to identify coordinates of the reflectors 103 according to various embodiments. The flowchart 900 of FIG. 9 includes an example of the operations of portions of the survey analysis system 215 and the AGV navigation system 218 according to various embodiments. It is understood that the flowchart of FIG. 9 provides merely an example of the many different types of functional arrangements that may be employed to implement the operations of the portions of the survey analysis system 215 and the AGV navigation system 218 as described herein. As an alternative, the flowchart of FIG. 9 may be viewed as depicting an example of elements of a method implemented in the computing environment 203 (FIG. 2) according to one or more embodiments.

Beginning with box 903, the survey analysis system 215 determines a reflector distribution plan 112 for installing reflectors 103 within the facility 100. The reflector distribution plan 112 corresponds to a layout of the optimal placement of the reflector devices 103 are distributed about the facility 100. One or more users may rely on the reflector distribution plan 112 for installation of the reflectors 103 throughout the facility. In various examples, the reflector distribution plan 112 is determined based at least in part on AGV path trajectories 115, AGV specification data 118, environment data 121, and/or other factors. For example, the survey analysis system 215 may determine a best placement location of the reflectors 103 by looking at the path of the AVG and any obstructions that may be within the path. In addition, the survey analysis system 215 relies of the AGV specification data 118 that defines guidelines with regard to the number of reflectors 103 required at start of the AGV and during the operation of the AGV. The parameters defined by the AGV specification data 118 in addition to the AGV path trajectories 115 and the environment data 121 can be used to determine the best placement of the reflectors 103 with the facility. In various examples, the reflector distribution plan 112 may define preferred mounting structures 124 on which to mount the reflectors 103 along with height placement recommendations.

At box 906, the reflectors 103 are installed within the facility 100 in accordance to the reflector distribution plan 112. The reflectors 103 may be mounted to the mounting structures 124 using the mounting brackets 400 in accordance to various embodiments of the present disclosure. Manual placement for reflectors 103 is done to "best-fit-at-location-standard." Accordingly, the scale of the installation and the accuracy limitations of the installers may make the precise manual placement of reflectors implausible. Accordingly, to meet tolerance requirements of the locations of the reflectors, a surveying is performed of the reflectors 103 after the installation.

At box 909, surveying of the facility 100 is performed. In various examples, a surveying scanner 106 is placed in a given location in the facility 100 where one or more reflectors 103 are in line of site of the surveying scanner 106. As previously discussed, the surveying scanner 106 comprises 3D stationary terrestrial LiDAR scanner technology for generating a point cloud map of the spatial elements within the volume of the facility 100. In particular, the surveying scanner 106 relies on scattering off surfaces to generate a return signal and is able to measure multiple targets at the same time. In various examples, the return signal for each scan corresponds to millions of points per second obtained from multiple targets in the line of sight of the surveying scanner 106. In various examples, scattering data associated with the return signal corresponds to the section of the reflector body 127 (e.g., the first end section 306 and the second end section 309) that are free from the reflective surface 130. As previously discussed, the surface of the reflector body 127 corresponding to the first end section 306 and the second end section 309 comprises scattering properties within an operational range of the surveying scanner 106 to allow the cylindrical geometry of the reflector 103 to be identified for coordinate location determination. The surveying of the facility 100 may comprise moving the surveying scanner 106 to various locations with the facility 100 to obtain survey signal data 221 used to identify the reflectors 103 and determine coordinate locations of the reflectors 103.

At box 912, the survey analysis system 215 obtains the survey signal data 221 from the surveying scanner 106. The survey signal data 221 comprises data associated with return signals associated with the survey performed in box 915. In particular, the survey signal data 221 includes scattered data corresponding to the reflector surfaces having scattering properties corresponding to the specifications of the surveying scanner 106 such that the survey signal data 221 can be used to accurately identify the reflectors 103 and the coordinates associated with the reflectors 103.

At box 915, the survey analysis system 215 generates a survey table 227 including coordinate data for each reflector 103 in the surveyed facility 100. The survey table 227 includes location data corresponding to each of the reflectors 103 distributed within the facility 100. According to various examples, the survey analysis system 215 analyzes the survey signal data 221 to create a single point cloud for each reflector 103 and isolate point cloud data for each of the reflectors 103. In various examples, the creation of the point cloud and isolation of the reflectors 103 may be based on a cylindrical modeling tool inside a CAD environment. Based on the isolated point clouds, the survey analysis system 215 may extract the centroid associated with the respective point cloud and determine x- and y-coordinates of the centroid for the respective reflectors 103.

In various examples, one of the plurality of reflectors 103 distributed in the facility environment correspond to a base point reflector 806 and the location of the remaining reflectors 103 is determined relative to the coordinate location (e.g., 0,0) of the base reflector 103. In various examples, the survey table 227 may be format compatible with a format defined by the AGV navigation system 218 to allow the AGV navigation system 218 to accurately analyze the survey table 227 and extract the data for generating the AGV map 108.

At box 918, the AGV navigation system 218 generates the AGV map 108 based at least in part on the data included in the survey table 227 and defined paths of the AGV 109. In various examples, the AGV navigation system 218 analyzes the data included in the survey table 227 as well as the AGV paths to create a map of the facility 100 with respect to the reflectors 103 distributed throughout the facility 100. The AGV map 108 may be generated based at least in part on the coordinate locations associated with each of the reflectors 103 relative to the location of the base reflector 103. In various examples, the survey table 227 may be provided as an input to the AGV navigation system 218 to generate the AGV map 108.

At box 921, the AGV map 108 is transmitted to an AGV 109. For example, the AGV navigation system 218 is in data communication with an AGV 109. In some examples, the AGV navigation system 218 transmits the AGV map 108 to the AGV in response to be created. In other examples, the AGV navigation system 218 provides the AGV map 108 to the AGV 109 in response to a request from the AGV 109 to the AGV navigation system 218. When navigating through the facility 100, the AGV 109 may scan the surrounding area via the AGV sensors 230 and compare the data obtained from the AGV sensor(s) 230 (e.g., return signals corresponding to the reflective surface 130) with the AGV map 108 to localize for navigation through the facility 100. Thereafter, this portion of the process proceeds to completion.

Figure 10:
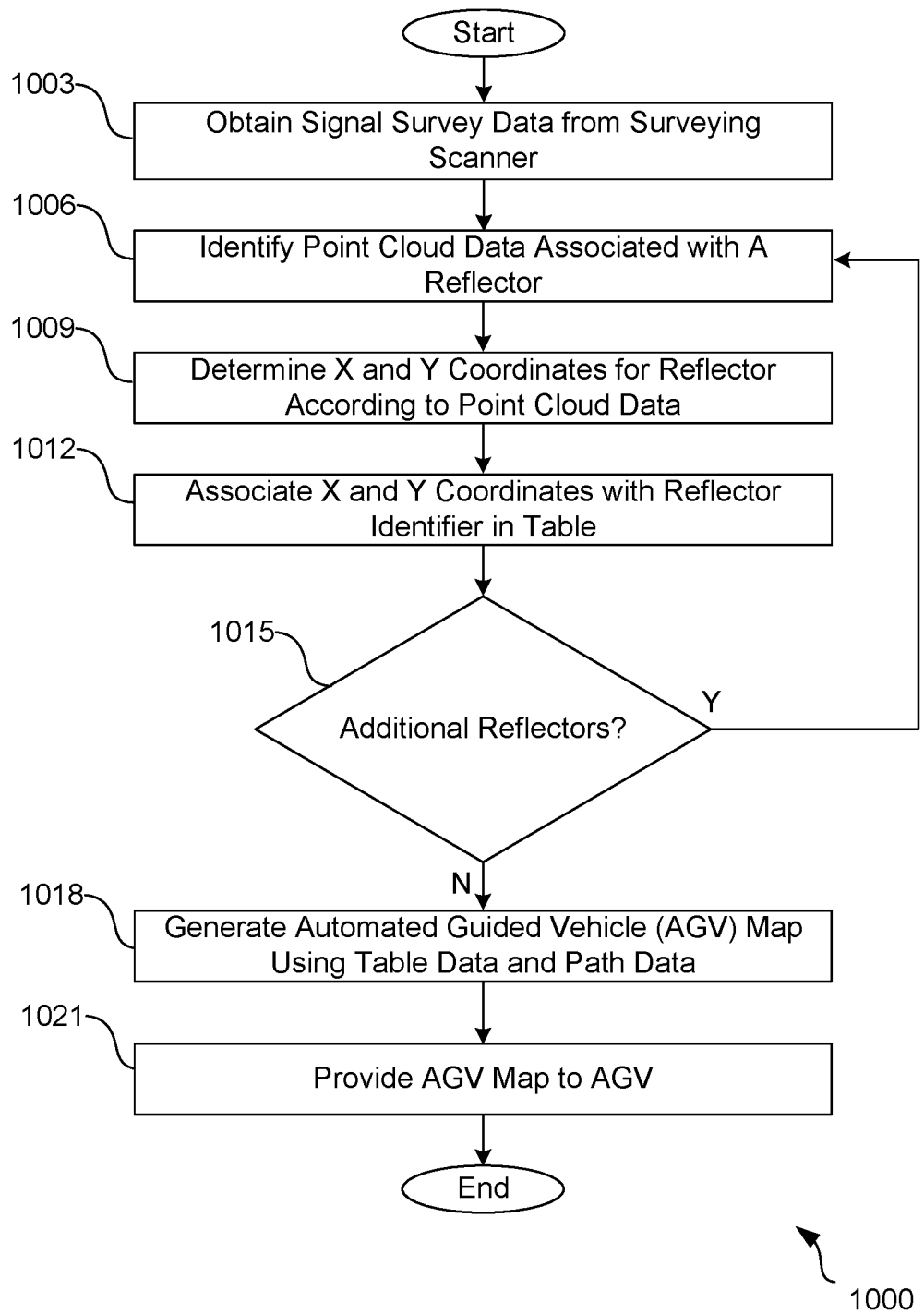
FIG. 10 is an example flowchart corresponding to the identification of reflector location using signal survey data and including portions of functionality of a survey analysis system and an AGV navigation system executed in a computing environment in the networked environment of FIG. 2 according to various embodiments of the present disclosure.

Referring next to FIG. 10, shown is a flowchart 1000 that includes an example of the operations of portions of the survey analysis system 215 and the AGV navigation system 218 according to various embodiments. It is understood that the flowchart of FIG. 10 provides merely an example of the many different types of functional arrangements that may be employed to implement the operations of portions of the survey analysis system 215 and the AGV navigation system 218 as described herein. As an alternative, the flowchart of FIG. 10 may be viewed as depicting an example of elements of a method implemented in the computing environment 203 (FIG. 2) according to one or more embodiments.

Beginning with box 1003, the survey analysis system 215 obtains the survey signal data 221 from the surveying scanner 106. The survey signal data 221 comprises data associated with return signals associated with the survey of the facility 100 and may correspond to data obtained from one or more locations within the facility 100. In particular, the survey signal data 221 includes scattered data corresponding to the reflector surfaces having scattering properties corresponding to the specifications of the surveying scanner 106 such that the survey signal data 221 can be used to accurately identify the reflectors 103 and the coordinates associated with the reflectors 103.

At box 1006, the survey analysis system 215 identifies point cloud data associated with a given reflector 103. The point cloud data may correspond to a plurality of scattered data points corresponding to reflections of the transmitted signal by the exposed surfaces of the reflector body 127 that do not contain the reflective surface 130 (e.g., the first end section 306 and the second end section 309). The survey analysis system 215 analyzes the point cloud data included in the survey signal data 221 and isolates point cloud data for each of the reflectors 103 according to the properties of the point cloud data. In various examples, the creation of the point cloud and isolation of the reflectors 103 may be based on a cylindrical modeling tool inside a CAD environment.

At box 1009, the survey analysis system 215 determines the x- and y-coordinates for the reflectors 103 according to the isolated point cloud data. For example, in some examples, the survey analysis system 215 may extract the centroid associated with the respective point cloud and determine x- and y-coordinates of the centroid for the respective reflectors 103. In various examples, the x- and y-coordinates relative to the 0,0 coordinates of the base point reflector 103.

At box 1012, the survey analysis system 215 associates the x- and y-coordinates to a reflector identifier in a survey table 227. According to various examples, the x- and y-coordinates of the reflectors 103 that are included in the survey table 227 are used by the AGV navigation system 218 to generate the AGV map 108.

At box 1015, the survey analysis system 215 determines if there are additional reflectors 103 to analyze. For example, if there is additional point cloud data in the survey signal data 221 that has not been analyzed for coordinate determination, the survey analysis system 215 will identify another reflector 103 and return to box 1006. Otherwise, the survey analysis system 215 proceeds to box 1018.

At box 1018, the AGV navigation system 218 generates the AGV map 108 based at least in part on the data included in the survey table 227 and the AGV paths. In various examples, the AGV navigation system 218 analyzes the data included in the survey table 227 to create a map of the facility 100 with respect to the reflectors 103 distributed throughout the facility 100. The AGV map 108 may be generated based at least in part on the coordinate locations associated with each of the reflectors 103 relative to the location of the base reflector 103. In various examples, the survey table 227 may be provided as an input to the AGV navigation system 218 to generate the AGV map 108.

At box 1021, the AGV map 108 is transmitted to an AGV 109. For example, the AGV navigation system 218 is in data communication with an AGV 109. In some examples, the AGV navigation system 218 transmits the AGV map 108 to the AGV in response to be created. In other examples, the AGV navigation system 218 provides the AGV map 108 to the AGV 109 in response to a request from the AGV 109 to the AGV navigation system 218. When navigating through the facility 100, the AGV 109 may scan the surrounding area via the AGV sensors 230 and compare the data obtained from the AGV sensor(s) 230 (e.g., return signals corresponding to the reflective surface 130) with the AGV map 108 to localize for navigation through the facility 100. Thereafter, this portion of the process proceeds to completion.

Figure 11:
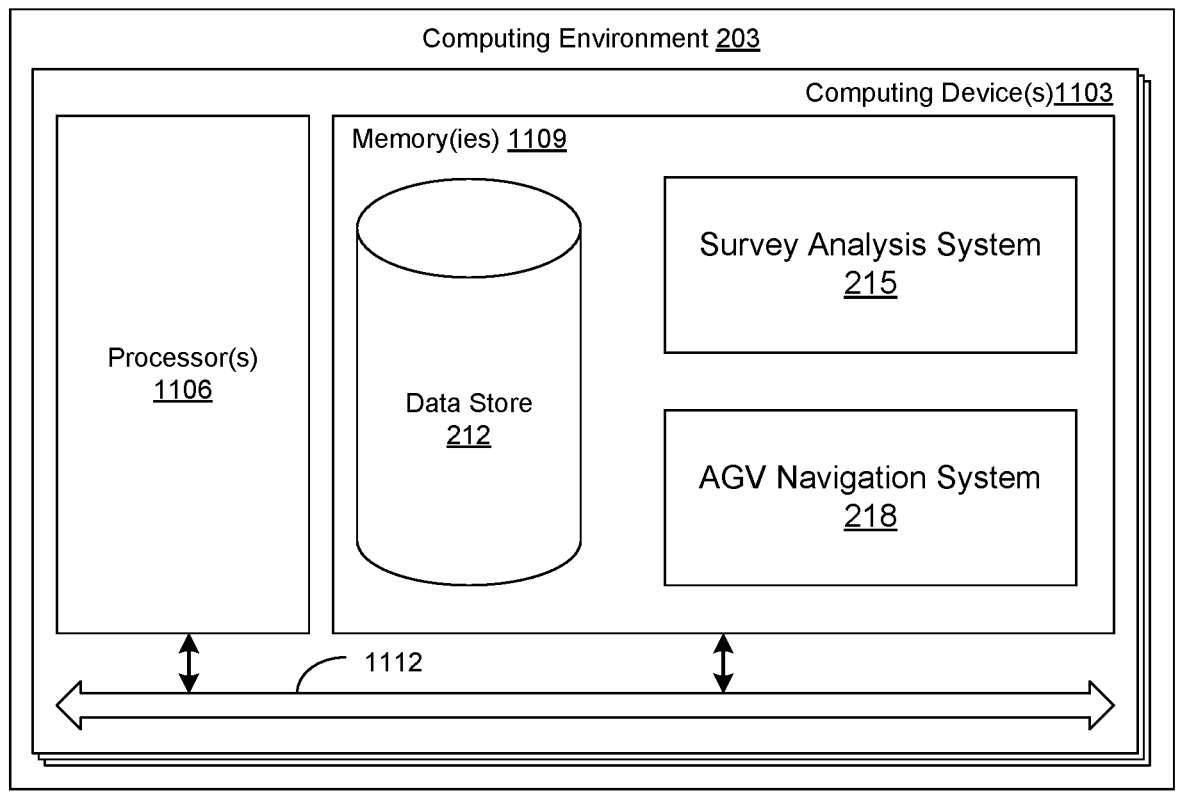
FIG. 11 is a schematic block diagram that provides one example illustration of a computing environment employed in the networked environment of FIG. 2 according to various embodiments of the present disclosure.

With reference to FIG. 11, shown is a schematic block diagram of the computing environment 203 according to an embodiment of the present disclosure. The computing environment 203 includes one or more computing devices 1103. Each computing device 1103 includes at least one processor circuit, for example, having a processor 1106 and a memory 1109, both of which are coupled to a local interface 1112. To this end, each computing device 1103 may comprise, for example, at least one server computer or like device. The local interface 1112 may comprise, for example, a data bus with an accompanying address/control bus or other bus structure as can be appreciated.

Stored in the memory 1109 are both data and several components that are executable by the processor 1106. In particular, stored in the memory 1109 and executable by the processor 1106 are a survey analysis system 215, an AGV navigation system 218, and potentially other applications.

Also stored in the memory 1109 may be a data store 212 and other data. In addition, an operating system may be stored in the memory 1109 and executable by the processor 1106.

It is understood that there may be other applications that are stored in the memory 1109 and are executable by the processor 1106 as can be appreciated. Where any component discussed herein is implemented in the form of software, any one of a number of programming languages may be employed such as, for example, C, C++, C #, Objective C, Java®, JavaScript®, Perl, PHP, Visual Basic® Python®, Ruby, Flash®, or other programming languages.

A number of software components are stored in the memory 1109 and are executable by the processor 1106. In this respect, the term "executable" means a program file that is in a form that can ultimately be run by the processor 1106. Examples of executable programs may be, for example, a compiled program that can be translated into machine code in a format that can be loaded into a random access portion of the memory 1109 and run by the processor 1106, source code that may be expressed in proper format such as object code that is capable of being loaded into a random access portion of the memory 1109 and executed by the processor 1106, or source code that may be interpreted by another executable program to generate instructions in a random access portion of the memory 1109 to be executed by the processor 1106, etc. An executable program may be stored in any portion or component of the memory 1109 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1109 is defined herein as including both volatile and nonvolatile memory and data storage components. Volatile components are those that do not retain data values upon loss of power. Nonvolatile components are those that retain data upon a loss of power. Thus, the memory 1109 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1106 may represent multiple processors 1106 and/or multiple processor cores and the memory 1109 may represent multiple memories 1109 that operate in parallel processing circuits, respectively. In such a case, the local interface 1112 may be an appropriate network that facilitates communication between any two of the multiple processors 1106, between any processor 1106 and any of the memories 1109, or between any two of the memories 1109, etc. The local interface 1112 may comprise additional systems designed to coordinate this communication, including, for example, performing load balancing. The processor 1106 may be of electrical or of some other available construction.

Although the survey analysis system 215, the AGV navigation system 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9 and 10 show the functionality and operation of an implementation of portions of the survey analysis system 215, the AGV navigation system 218, and/or other applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1106 in a computer system or other system. The machine code may be converted from the source code, etc. If embodied in hardware, each block may represent a circuit or a number of interconnected circuits to implement the specified logical function(s).

Although the flowcharts of FIGS. 9 and 10 show a specific order of execution, it is understood that the order of execution may differ from that which is depicted. For example, the order of execution of two or more blocks may be scrambled relative to the order shown. Also, two or more blocks shown in succession in FIGS. 9 and 10 may be executed concurrently or with partial concurrence. Further, in some embodiments, one or more of the blocks shown in FIGS. 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the survey analysis system 215 and the AGV navigation system 218, that comprises software or code can be embodied in any non-transitory computer-readable medium for use by or in connection with an instruction execution system such as, for example, a processor 1106 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the survey analysis system 215 and the AGV navigation system 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1103, or in multiple computing devices 1103 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a plurality of reflectors distributed within a facility such that each location in an operational area of the facility is associated with a unique fingerprint of the plurality of reflectors, a respective placement of individual reflectors among the plurality of reflectors within the facility being based at least in part on one or more automated guided vehicle (AGV) path trajectories in the facility;
   a three-dimensional (3D) light detection and ranging (LiDAR) scanner configured to scan and generate survey signal data corresponding to at least two or more reflectors among the plurality of reflectors at a given instance, the at least two or more reflectors being within a line of sight of the 3D LiDAR scanner at a given position of the 3D LiDAR scanner; and
   at least one computing device in data communication with the 3D LiDAR scanner, the at least one computing device comprising at least one application that, when executed, directs the at least one computing device to at least:
   obtain the survey signal data from the 3D LiDAR scanner;
   determine respective location data corresponding to a respective location for each reflector of the at least two or more reflectors based at least in part on the survey signal data and the unique fingerprint associated with each location;
   generate an AGV map based at least in part on the survey signal data and the respective location data; and
   transmit the AGV map to an AGV, the AGV relying on the AGV map and the plurality of reflectors for guidance within the facility.

2. The system of claim 1, wherein the individual reflectors comprise:
   a cylindrical body having a first longitudinal length extending from a first end to a second end, the cylindrical body comprising a first section, a second section and a third section; and
   a retro-reflective surface substantially surrounding the third section of the cylindrical body, the retro-reflective surface extending a second longitudinal length that is less than the first longitudinal length such that the first section and the second section of the cylindrical body are free of the retro-reflective surface.

3. The system of claim 2, wherein the retro-reflective surface of individual reflectors enables guidance of the automated guided vehicle (AGV) within the facility and the first section and the second section of the cylindrical body that are free of the retro-reflective surface facilitate in surveying of the facility via the 3D LiDAR scanner.

4. The system of claim 1, wherein determining the respective location data comprises determining an x-coordinate and a y-coordinate corresponding to a respective location based at least in part on the survey signal data.

5. The system of claim 1, wherein the survey signal data comprises first survey signal data corresponding to a first position of the 3D LiDAR scanner, and the AGV map is generated based at least in part on the first survey signal data and second survey signal data obtained from the 3D LiDAR scanner, the second survey signal data corresponding to signal data obtained by the 3D LiDAR scanner from at least one additional location of the 3D LiDAR scanner within the facility.

6. A method, comprising:
   obtaining, via at least one computing device, survey signal data from a three-dimensional (3D) light detection and ranging (LiDAR) scanner used to survey a facility area comprising a plurality of reflectors such that each location in an operational area of the facility is associated with a unique fingerprint of the plurality of reflectors, the survey signal data corresponding to a plurality of signals received from the plurality of reflectors positioned within the facility area according to a reflector distribution plan;

determining, via at least one computing device, a plurality of locations associated with the plurality of reflectors within the facility area based at least in part on an analysis of the survey signal data and the unique fingerprints associated with each location;

generating, via at least one computing device, an automated guided vehicle (AGV) map based at least in part on the survey signal data and the plurality of locations; and transmitting, via the at least one computing device, the AGV map to an AGV, the AGV using the AGV map and the plurality of reflectors for guidance along one or more paths within the facility area.

7. The method of claim 6, wherein individual reflectors of the plurality of reflectors comprise:

a reflector body having a first longitudinal length extending from a first end to a second end; and a reflective surface substantially surrounding a first portion of the reflector body, the reflective surface having a second longitudinal length that is less than the first longitudinal length thereby exposing a second portion of a reflector body surface of the reflector body that fails to comprise the reflective surface.

8. The method of claim 7, wherein:

the reflective surface comprises a first set of optical properties to enable guidance of the automated guided vehicle (AGV) within the facility area, and the reflector body surface of the reflector body comprises a second set of optical properties that facilitate in an identification of the individual reflectors during a surveying of the facility area using the 3D LiDAR scanner.

9. The method of claim 7, wherein determining the plurality of locations comprises determining a respective x-coordinate position and a respective y-coordinate position for the individual reflectors of the plurality of reflectors based at least in part on scattering data included in the survey signal data, and the scattering data corresponds to the second portion of the reflector body surface of the reflector that is free of the reflective surface.

10. The method of claim 6, further comprising generating a table based at least in part on the signal survey data, the table comprising a reflector identifier, an x-coordinate position, and a y-coordinate position for individual reflectors of the plurality of reflectors.

11. The method of claim 10, wherein generating the AGV map is based at least in part on applying the table and one or more AGV paths as an input to an AGV navigation application configured to create the AGV map for the AGV.

12. The method of claim 6, further comprising determining the reflector distribution plan for positioning the plurality of reflectors, the reflector distribution plan being based at least in part on at least one of one or more AGV path trajectories in the facility area, one or more identified obstructions in the facility area, or one or more AGV reflector specifications.

13. The method of claim 6, wherein surveying the facility area comprises moving the 3D LiDAR scanner to a plurality of scanning locations within the facility area, a respective subset of the survey signal data corresponding to scanned data obtained by the 3D LiDAR scanner at individual scanning locations of the plurality of scanning locations.

14. The method of claim 6, wherein the facility area comprises a plurality of mounting structures, and individual reflectors among the plurality of reflectors being mounted on a respective mounting structure of the plurality of mounting structures.

15. A reflector device, comprising:

a cylindrical body having a first longitudinal length extending from a first end to a second end; and a reflective surface substantially surrounding a first portion of the cylindrical body, the reflective surface having a second longitudinal length that is less than the first longitudinal length, and the reflective surface having one or more optical properties for enabling guidance of an automated guided vehicle (AGV) within a facility area via a unique fingerprint associated with the reflector device, and wherein the reflective surface is situated about the cylindrical body such that a second portion of the cylindrical body is free of the reflective surface thereby exposing a cylindrical body surface of the cylindrical body to facilitate surveying of the facility area via a three-dimensional (3D) LiDAR scanner, exposure of the cylindrical body surface to the 3D LiDAR scanner causing data to be scattered, thereby allowing for a discernment of a shape of the reflector device, and enabling a determination of the reflector device coordinates relevant for the surveying.

16. The reflector device of claim 15, further comprising one or more longitudinal slots disposed along a longitudinal axis of the cylindrical body.

17. The reflector device of claim 16, further comprising one or more mounting brackets engaged with the one or more longitudinal slots, the one or more mounting brackets being configured to mount the cylindrical body to a support structure.

18. The reflector device of claim 15, wherein the second portion of the cylindrical body comprises a first end section and a second end section, and at least one of a first end longitudinal length of the first end section of the cylindrical body or a second end longitudinal length of the second end section of the cylindrical body is about 20 centimeters.

19. The reflector device of claim 15, wherein the second portion of the cylindrical body is configured to comprise a scattering coefficient that facilitates detection of the second portion of the cylindrical body by the three-dimensional (3D) LIDAR scanner.

20. The reflector device of claim 15, wherein the reflective surface comprises a retro-reflective surface.

* * * * *